United States Patent [19]

Blaha

[11] 4,267,635
[45] May 19, 1981

[54] METHOD OF MAKING A SOLID STATE ELECTRICAL SWITCH

[75] Inventor: Robert F. Blaha, Dedham, Mass.

[73] Assignee: Texas Instruments Incorporated, Dallas, Tex.

[21] Appl. No.: 884,779

[22] Filed: Mar. 8, 1978

Related U.S. Application Data

[63] Continuation of Ser. No. 682,421, May 3, 1976.

[51] Int. Cl.³ .............................................. H01C 7/00
[52] U.S. Cl. ...................................... 29/622; 29/612; 338/22 R; 338/220
[58] Field of Search ...................... 29/622, 610 R, 612, 29/620, 621, 22; 338/20, 22 R, 49, 220, 13, 22; 310/68 C; 318/221 E, 418, 221 H; 317/9 R; 174/52 R

[56] References Cited

U.S. PATENT DOCUMENTS

| | | | |
|---|---|---|---|
| 3,586,939 | 6/1971 | Buiting | 318/221 E |
| 3,716,407 | 2/1973 | Kahn | 427/88 |
| 3,737,752 | 6/1973 | Strachan | 318/471 |
| 3,742,419 | 6/1973 | Martzloff | 338/22 |
| 3,794,949 | 2/1974 | Larsen | 338/22 R |
| 3,835,434 | 9/1974 | Kahn | 338/22 R |
| 3,842,188 | 10/1974 | Petersen | 174/52 R |
| 3,878,501 | 4/1975 | Moorhead | 338/22 R |
| 3,925,748 | 12/1975 | Slocum | 338/57 |

Primary Examiner—Charlie T. Moon
Assistant Examiner—Gene P. Crosby
Attorney, Agent, or Firm—James P. McAndrews; John A. Haug; Melvin Sharp

[57] ABSTRACT

A solid state electrical switch of versatile and economical structure for use in starting a split-phase electrical motor incorporates a single cup-shaped dielectric casing open at one end. A first terminal disposed within the casing has a connector portion extending through the casing wall to receive connection from the starting winding of such a motor. A ceramic-type resistor element of positive temperature coefficient (PTC) of resistivity which displays a sharp increase in resistivity when it is heated to a selected temperature by directing electrical current through the resistor is disposed in engagement with the first terminal within the casing. The PTC resistor element is formulated so that the same size element is suitable for different applied voltage levels. A second terminal which has a heat-dissipating plate portion closing the open casing end and engaging the resistor element has a connector portion of the terminal extending through the casing wall for receiving connection from the main winding of such a motor.

2 Claims, 5 Drawing Figures

METHOD OF MAKING A SOLID STATE ELECTRICAL SWITCH

This is a continuation of application Ser. No. 682,421, filed May 3, 1976.

In split-phase electrical motors, an auxiliary or starting winding is connected directly across the power supply in parallel with the main motor winding to provide the motor with a desired starting torque. Such a starting winding is normally wound with fewer turns and with smaller wire than the main motor winding and the current density in the starting winding is quite high so that the rate of temperature rise in the starting winding is also quite high. In order to prevent overheating of the starting winding and to increase motor efficiency, it is important to remove the starting winding from the motor circuit promptly after motor starting has been effected. In the past, this has been accomplished by the use of various means including centrifugal and solid state switches as well as electrical relays of various types. In U.S. Pat. No. 3,921,117, issued Nov. 18, 1975 a solid state switch is described and claimed which is particularly useful with such motors. The resistor element used in that switch was designed for a typical application, that is, it was designed to be used to start a split phase motor having a certain maximum applied voltage, so that specific dimensions for the element were determined.

It is an object of this invention to provide a novel and improved solid state switch which can be used with different applied voltages; to provide such a solid state switch which is particularly adapted for use in starting of split-phase and capacitor start electrical motors; to provide a solid state switch with higher maximum voltage gradient capabilities; to provide solid state switches in which the same housing components can be utilized for different ratings; and to provide such switches which are of versatile application.

Other objects, advantages and details of the solid state switch of this invention appear in the following detailed description of preferred embodiments of the invention, the detailed description referring to the drawings in which.

Figure 1:
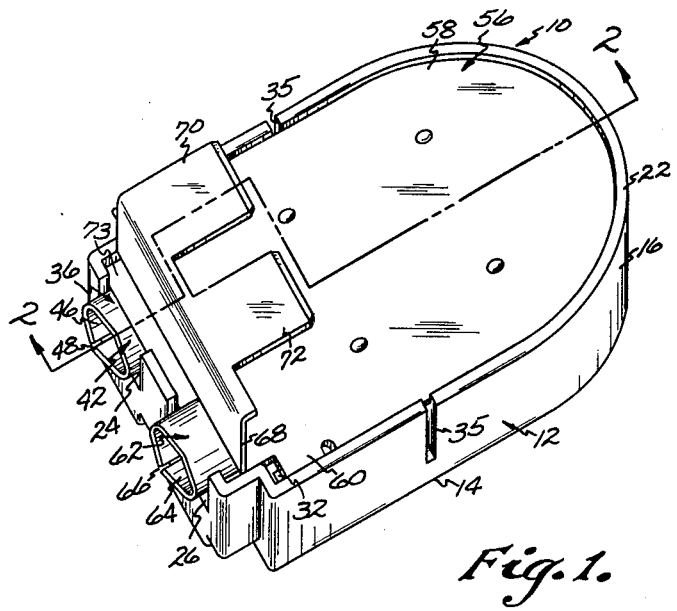
FIG. 1 is a perspective view of the solid state electrical switch of this invention.
Figure 2:
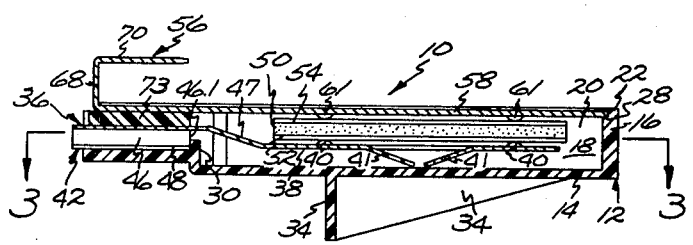
FIG. 2 is a section view along line 2—2 of FIG. 1.
Figure 3:
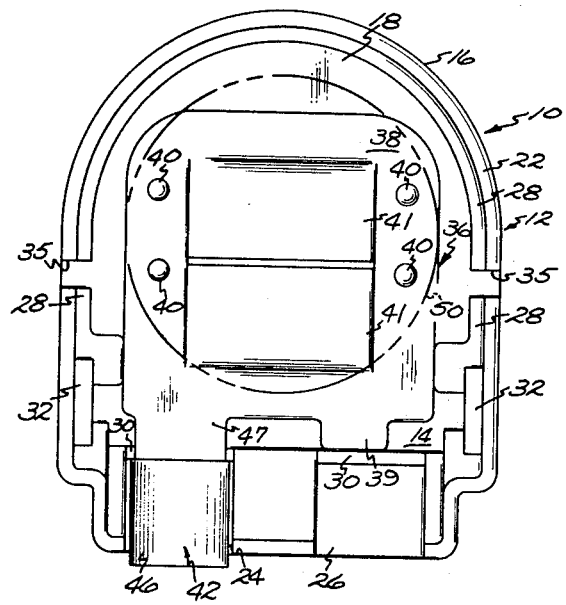
FIG. 3 is a section view along line 3—3 of FIG. 2.

Referring to the drawings, 10 in FIGS. 1–3 indicates the novel and improved solid state switch of this invention which is shown to include a generally cup-shaped casing 12 having a bottom 14 and a sidewall 16 forming a casing chamber 18 which is open at one end 20 and which has a rim 22 extending around the open casing end. As shown, the casing rim preferably has a slotted portion indicated by the slots 24 and 26 and, as is shown particularly in FIGS. 1 and 3, the casing sidewall preferably has a groove extending substantially around the sidewall forming a shoulder 28 within the casing chamber. Preferably also the casing has an additional wall 30 upstanding from the casing bottom in spaced adjacent relation to the slotted portion of the casing rim. The casing also has a plurality of apertures 32, best shown in FIG. 3, which preferably extend through the casing sidewall from the sidewall shoulder 28 and which open exteriorly of the casing adjacent the casing bottom. The casing 12 is formed of an electrically insulating or dielectric material and is preferably formed of a relatively rigid material such as a thermoplastic polyester polyphenylene sulfide or the like. Preferably also the casing has reinforcing means 34 integrally formed therein as shown in FIG. 2. If desired, slots 35 are formed in the casing sidewall to facilitate dissipation of heat from the switch.

In accordance with this invention, a first electrically conductive metal terminal 36, preferably formed of stiffly resilient material such as plated phosphor bronze, beryllium copper or steel or the like is disposed within the casing 12. As shown, the first terminal preferably has a plate portion 38 provided with a plurality of raised projections 40 thereon and has integral spring legs 41 extending downwardly from the plate portion 38 to resiliently bear against the casing bottom 14. If desired, the first terminal also has a spacer portion 39 engaging the wall 30 of the casing 12 for positioning the first terminal within the casing. The first terminal also has a connector portion 42 extending through the casing sidewall. Preferably, for example, the connector portion 42 is integral with the plate portion of the terminal and has the form of a metal sleeve 46 of selected length connected to the plate portion 38 by an intermediate connector part 47 and split as indicated at 48, one end 46.1 of the sleeve being engaged with the additional wall 30 of the casing for locating the terminal laterally within the casing with the sleeve extending through the slot 24 in the casing sidewall.

A resistor element 50 is also disposed within the casing chamber 18. Preferably the resistor element 50 is formed of a ceramic material such as a lanthanum-doped barium titanate having a positive temperature coefficient of resistivity. Preferably the selected resistor material is adapted to be self-heated by directing electrical current through the resistor material and is adapted to display a sharp and very large increase in electrical resistance when heated to a selected temperature for reducing current flow through the material to a very low level and for thereby limiting the heating of said resistor material to approximately that selected temperature level. As shown, the resistor 50 is preferably in disc form and has contact surfaces 52 and 54 formed thereon by metallizing or the like in any conventional manner for facilitating the electrical contact to the resistor element. The contact surface 52 of the resistor element is disposed on the projections 40 on the first terminal 36 in electrical engagement with that terminal.

The solid state switch 10 further includes a second electrically conductive metal terminal 56. The second terminal 56 has a plate portion 58 which rests on the casing shoulder 28 as is shown in FIG. 2 for closing the open end 20 of the casing and has a plurality of tabs 60 which are preferably integral with the plate portion 58 and which extend into respective apertures 32 in the casing. As shown, the plate portion 58 of the second terminal preferably has a plurality of projections 61 formed thereon for electrically engaging the contact surface 54 of the resistor element 50. The second terminal also has a connector portion 62, preferably in the form of a metal sleeve 64 split at 66 and welded or otherwise connected to the terminal plate portion 58 and extending through the casing rim slot 26, the connector sleeve 64 also having an end engaged by the additional wall 30 of the casing for assisting in locating the second terminal relative to the casing. As shown particularly in FIG. 1, the second terminal 56 preferably has an upturned flange portion 68 having one or more tab terminals such as the tabs 70 and 72 extending from the flange spaced above the plate portion of the terminal 56. In a preferred construction, an insulator strip 74 is entrapped between the sleeve connector 46 of terminal 36 and a part of terminal 56 and between the rim 22 and additional wall 30 of the casing for assuring that the sleeve connector 46 is electrically insulated from the terminal 56.

Figure 4:
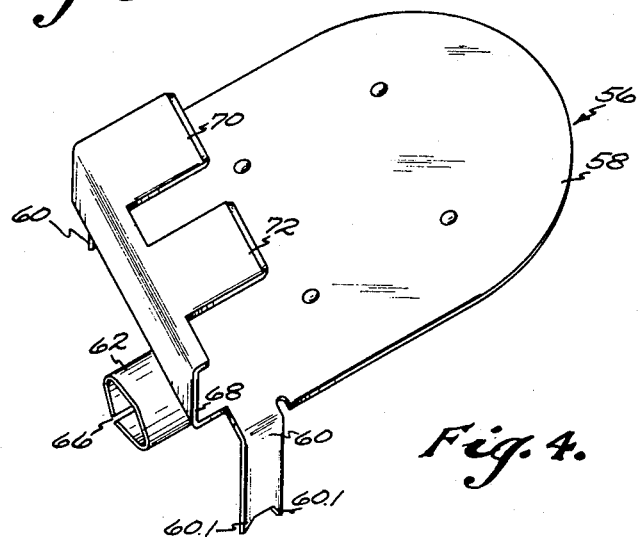
FIG. 4 is a perspective view of a component of the switch of FIG. 1.

As shown particularly in FIG. 4, the extending tabs 60 of the second terminal 56 preferably have a pair of extensions 60.1 at the tab ends which are flared away from each other after the tabs have been inserted through the apertures 32 in the dielectric casing. In this way, the flared tab extensions form enlarged ends on the tabs which bear against the casing exteriorly of the casing for holding the two terminals 36 and 56 as well as the resistor element 50 securely together with the casing 12 while resiliently pressing the two terminals into firm electrical engagement with respective opposite contact surfaces of the resistor and while resiliently pressing the spring portions 41 of the first terminal against the casing bottom.

Figure 5:
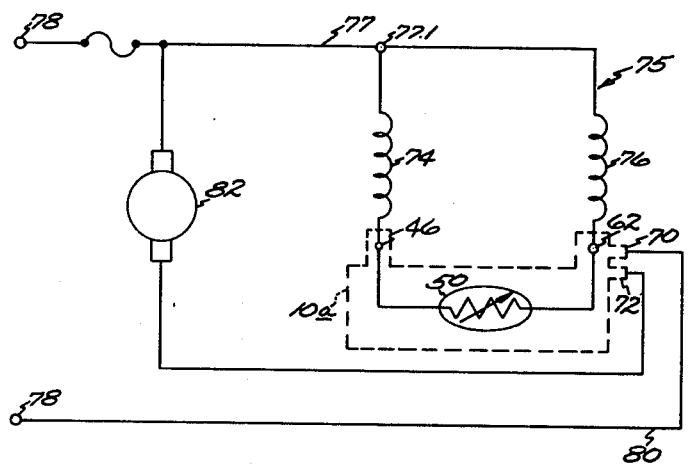
FIG. 5 is a schematic view illustrating application of the switch of this invention.

In this arrangement, the solid state switch is of very inexpensive construction utilizing a minimal number of component parts but is easily and accurately assembled to provide a switch which is very versatile in application. The switch terminals are readily adapted to receive either leads or pin connections in the receptacle-like sleeve connector portions of the terminals and the second terminal includes the tab terminals 70 and 72 for facilitating quick electrical connection of the switch to a line lead and, if desired, to a fan motor lead. For example, as is illustrated schematically in FIG. 5, wherein the switch 10 is indicated by broken line 10a, the sleeve connector 46 of the switch 10 is conveniently adapted to be electrically connected to one end of the start winding 74 of a split-phase electrical motor 75 while the sleeve connector 64 of the switch is adapted for convenient electrical connection to one end of the main winding 76 of the motor, the opposite ends of the motor windings being connected to a line lead 77 from the power supply (indicated by the terminals 78). The tab terminal 70 of the switch 10 is then conveniently connected to the line lead 80. In this way, the resistor element 50 of the switch is conveniently connected in series with the start winding 74 in parallel with the main winding 76 across the power supply so that, when the motor 75 is started, the start winding is initially energized to start the motor but so that, as the resistor element 50 is heated by the start winding current directed therethrough, the resistor reaches a selected temperature at which the resistance of the element sharply increases for effectively removing the start winding from the motor circuit and for thereafter limiting heating of the resistor element to approximately said selected temperature. The small additional heat thereafter generated by the resistor is effectively dissipated from the switch 10 through the plate portion 58 of the second terminal 56, through the terminal sleeves 42 and 46, and through the casing slots 35 when provided. The heat-dissipating nature of the plate portion 58 also permits the switch 10 to cool to normal temperature more quickly after the motor is deenergized for permitting faster restarting of the motor when required. Where the motor 75 is provided in a hermetically sealed unit for refrigeration compressor applications or the like, and where the motor leads are brought out of the sealed unit through closely spaced pins sealed in the unit casing, the connector sleeve portions 46 and 64 of the switch conveniently fit over the closely spaced pins for pluggable mounting of the switch and the tab terminal is readily connected to the line lead 80, the compact construction of the switch 10 conveniently disposing the resistor element 50 in series with the start winding 74 in parallel with the main motor winding 76. Further, where an additional pin element 77.1 (see FIG. 5) is extended through the casing of a sealed motor unit for connecting the common lead 77 to the motor winding as is conventional, such a pluggable mounting of the switch 10 on two of the motor lead pins disposes the plate part 34.2 of the casing reinforcing means over such an additional pin for shielding the connection of the lead 77 to that pin and for tending to retain such a lead connection on the additional pin. If a fan is to be used with the motor 75, a lead from the fan motor 82 is also conveniently attached to the tab terminal 72 on the switch 10. It will be understood that although the switch 10 is shown for use in starting of a split-phase motor, the switch 10 is also adapted for use in starting of other types of motors such as capacitor start motors as well as in other applications, the switch providing a very economical switch construction for a wide variety of uses.

In providing a particular resistor element 50, as disclosed in the aforementioned U.S. Pat. No. 3,921,117, several factors need to be considered. For example, according to the state of the art, the maximum recommended voltage gradient for such a resistor element is approximately 800 volts per centimeter for PTC material with an anomaly temperature of approximately 120° C. as indicated in "Self-Regulating PTC Heating Systems, A New Approach For Electric Heating Appliances" by Youn H. Ting, presented at IEEE Appliance Technical Conference, May 4, 1971. Further, other PTC devices available in the market were found to have a maximum specified voltage gradient of slightly less than 1000 volts per centimeter. The thickness of element 50 is selected so that the safe limit of the voltage gradient is not exceeded by the maximum applied voltage to which the element will be subjected in a particular application. Also, the diameter of the cylindrical element must be selected so that the specific dimensions of casing 12 can be determined. The dimensions of element 50 and casing 12 are determined for a typical application, such as starting a split phase motor described in the above mentioned patent. By way of example, for a 110 VAC motor an element was selected having a diameter of approximately 2.13 cm, a thickness of 0.33 cm and a bulk resistivity of 60 ohm cm which corresponds to a digital volt meter (dvm) resistance of 6 ohms (room temperature resistance). It will be noted that bulk resistivity can be adjusted by various techniques known in the art of PTC material manufacture.

In order to minimize inventory requirements it is highly desirable to use casing 12 for applications having other maximum applied voltage levels. Pursuant to the teaching of the known state of the art the size of the PTC element, as well as the size of casing 12, would have to be changed for different voltage levels realizing that the maximum safe voltage gradient across the element should not be exceeded. For example a 220 VAC motor starting application, according to conventional techniques, would require a resistor element having a greater thickness than that used for the 110 VAC application mentioned above. In accordance with the invention, rather than increasing the thickness of the element, applicant has found that the voltage gradient across element 50 may be significantly increased by using higher resistivity material. Applicant has also found that in spite of the contrary teaching of the prior art that the voltage gradient can be safely raised to between 1000 and 1614 volts per centimeter. In a 220 VAC motor starting application having a maximum applied voltage of 355 VAC the bulk resistivity was increased to 250 ohm cm with a corresponding dvm resistance of 25 ohms and a resulting maximum voltage gradient of approximately 1520 volts per centimeter. While it may be possible to increase the resistance to higher levels, insufficient starting current is developed in motors of the type described at resistance levels much higher than 25 ohms. In other respects the element was the same as that used in the above referenced 110 VAC application, i.e., diameter approximately 2.13 cm, thickness 0.33 cm and mass of approximately 5.05 grams per cc. It was also found that switch life is enhanced by maintaining the operating temperature of element 50 at approximately 170°–180° C. or less which can be effected by the applied voltage, ambient temperature, air flow in the area in which the switch is located and the heat dissipation characteristics of casing 12. To insure the maximum life it should be determined that the operating temperature does not exceed the stated limit at a worse case ambient temperature of 43° C.

It will be seen from the above that the provision of a switch having higher voltage gradient capability enables one to fabricate a switch housing which can be used for a variety of different voltage ratings without changing the size of the PTC element by changing the PTC resistivity.

It should also be understood that although particular embodiments of the invention have been described by way of illustration, this invention includes all modifications and equivalents of the disclosed embodiments falling within the scope of the appended claims.

I claim:

1. In a method employing a solid state electrical switch having an element with first and second contact surfaces separated by a thickness of material having a relatively constant (base) resistivity at temperatures below an anomaly temperature and rapidly increasing resistivity with increasing temperature above said anomaly, the switch being subjected to a given maximum applied voltage across the thickness of the element, comprising the step of selecting the thickness of the element so that the voltage gradient is between approximately 1000 and 1614 volts per centimeter and forming the element so that its base resistivity is approximately 250 ohm cm or higher.

2. The method of claim 1 in which the element is disposed in a casing and the element has a normal operating temperature dependent upon the applied voltage and the heat dissipation characteristics of the casing, including the step of maintaining the operating temperature below approximately 180° C. at ambient temperatures up to 43° C.

* * * * *